No. 660,530. Patented Oct. 23, 1900.
O. KRETSCHMER.
VESSEL CLOSING DEVICE.
(Application filed Aug. 18, 1900.)

(No Model.)

Witnesses:
Edwin King Lundy
Geo. M. Copenhaver.

Inventor:
Otto Kretschmer
by Marcellus Bailey
atty

United States Patent Office.

OTTO KRETSCHMER, OF DRESDEN, GERMANY, ASSIGNOR TO THE ACTIEN-GESELLSCHAFT FÜR GLASINDUSTRIE, VORMALS FRIEDR. SIEMENS, OF SAME PLACE.

VESSEL-CLOSING DEVICE.

SPECIFICATION forming part of Letters Patent No. 660,530, dated October 23, 1900.

Application filed August 18, 1900. Serial No. 27,283. (No model.)

*To all whom it may concern:*

Be it known that I, OTTO KRETSCHMER, a subject of the King of Prussia, Emperor of Germany, residing at Dresden, Saxony, German Empire, have invented certain new and useful Improvements in Vessel Closing or Stopping Devices, of which the following is a specification.

My invention relates to a closing or stopping device for vessels, and especially for bottles, which can be fitted on or removed from the vessel or bottle without it being necessary to use any tool for the purpose.

In my improved stopper the bail is so shaped that it effects a more elastic and more efficient closure. Instead of the open bail hitherto used I use a cross-shaped one, which permits of the stopper being rapidly and very easily put on the vessel or bottle.

The various parts constituting my improved closing or stopping device can be removed from the neck of a vessel without the assistance of any tool, which is not the case with the jointed-lever closing devices hitherto used—such as, for instance, those forming the subject of Letters Patent Nos. 58,602 and 59,915, granted in Germany.

On the accompanying drawings I have shown how my said invention may be conveniently and advantageously carried into practice.

Figure 1:
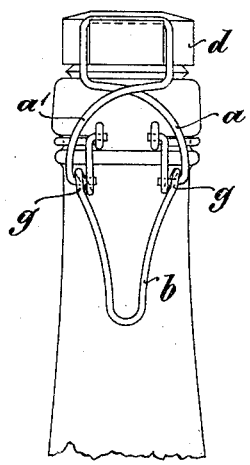
Figure 2:
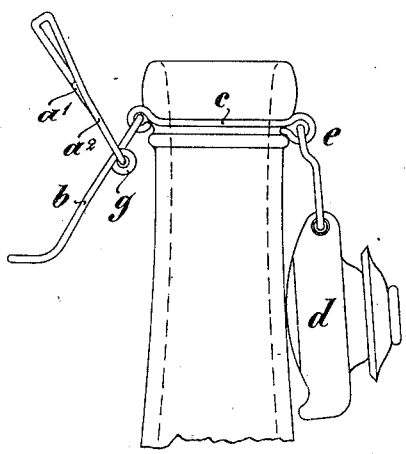
Figure 3:
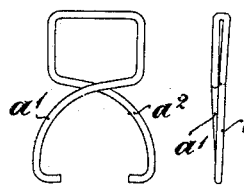
Figure 4:
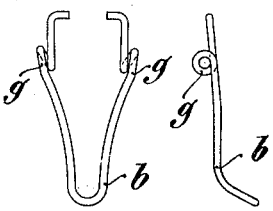
Figure 5:
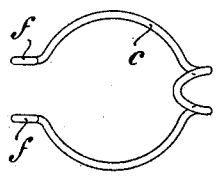
Figure 5:
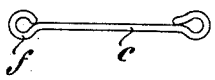

In the drawings, Figure 1 shows a front view of the device when closed; Fig. 2, a side view of the same when unclosed. Fig. 3 is the bail made of crossed wire. Fig. 4 is the jointed closing, and Fig. 5 the neck-ring.

Like letters of reference indicate like parts throughout the drawings.

The stopper $d$ is movably attached to the neck-ring $c$ by means of a link $e$. On the opposite side the neck-ring is open, and its extremities are there shaped out, as eyes $f f$, for the reception of the jointed hinged lever $b$, which is likewise provided with eyes $g g$, in which enter the bent extremities of the crossed springy legs $a'$ $a^2$ of the bail.

In closing a bottle to which my improved closing device is applied the upper part of the bail is passed over the stopper or lid, and by pressing down the locking-lever $b$ the elastic action of the legs $a'$ $a^2$ of the bail operates in such a manner that the two eyes $f f$ of the neck-ring, which act as bearings for the closing-lever, are brought nearer each other by the springing action of the crossed legs $a'$ and $a^2$. As the neck-ring is closed firmly and elastically only when the vessel is closed, an increase in the elastic part of the closing action is obtained.

All the parts of my improved closing device constitute, therefore, a mechanism whose parts are entirely interdependent and so contrived that it is only when the vessel is in its closed condition that it is in an increased state of elastic tension.

My new closure device can be rapidly applied to or removed from the vessel and this, as already stated, without the assistance of tools. The neck-ring, with its front open part and stopper attached by a link to the opposite part, is simply shoved on the mouthpiece of the vessel, and then the bent ends of the locking-lever, which is hinged on the bail, are hooked in the eyes provided on the neck-ring.

In closing the vessel only the springy action of the open ring and that of the locking-lever have to be overcome.

Having thus described my invention, what I claim, and desire to secure by Letters Patent, is—

A closing device for vessels, bottles and the like, consisting in the combination with the neck or mouthpiece of the said vessels, bottles and the like, of a ring having on one side the stopper linked to it and being open at the other side where its extremities are shaped in the form of eyes, a V-shaped locking-lever provided with eyes in its prongs and having its ends bent inward and engaging the eyes of the ring and a bail of wire the legs of which are crossed and have their extremities bent inward so as to engage the eyes of the said locking-lever, substantially as and for the purpose described.

In testimony whereof I have hereunto set my hand in presence of two subscribing witnesses.

OTTO KRETSCHMER.

Witnesses:
   HERNANDO DE SOTO,
   PAUL ARRAS.